(12) United States Patent
Amon et al.

(10) Patent No.: US 6,867,930 B1
(45) Date of Patent: Mar. 15, 2005

(54) INFRARED OPTICS AND MANUFACTURE THEREOF

(75) Inventors: Max Amon, Maitland, FL (US); Richard A. Leblanc, Clermont, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 10/418,489

(22) Filed: Apr. 18, 2003

(51) Int. Cl.[7] .............................................. G02B 17/00
(52) U.S. Cl. ...................................................... 359/726
(58) Field of Search ................................ 359/726–736, 359/432

(56) References Cited

U.S. PATENT DOCUMENTS 5,969,860 A * 10/1999 Mearns ....................... 359/432

* cited by examiner

*Primary Examiner*—Georgia Epps
*Assistant Examiner*—Jack Dinh
(74) *Attorney, Agent, or Firm*—Jeffrey D. Myers; Peacock Myer & Adams, P.C.

(57) ABSTRACT

An optic and method of manufacture comprising a center portion comprising a front surface and a back surface and a mangin surrounding the center portion and comprising a front surface and a back surface, wherein the front surface of the center portion is flat and reflective rearward and the front surface of the mangin is spherical.

20 Claims, 3 Drawing Sheets

Phantom Pixels:
Width = 50.000 Micrometers
 = 0.0020 Inches
Height = 50.000 Micrometers
 = 0.0020 Inches WV (Micro-Meters)   Spot-Rays Requested
+ 10.000000   100
△ 7.500000   100
□ 12.000000   100

FOB-Y 1.0000
FOB-X 0.0000

FOB-Y 0.7071
FOB-X 0.0000

FOB-Y 0.0000
FOB-X 0.0000

C7D Folded Molded Magin No Plug EOS
0.002000
Input SF = 0.002000
CFG = 1

−0.004000

Differential -Ray
Field Curves
( S - Dashed )
( T - Solid )

Focal Data
Centered on Chief Ray

INFRARED OPTICS AND MANUFACTURE THEREOF

BACKGROUND OF THE INVENTION

1. Field of the Invention (Technical Field)

The present invention relates to infrared optics and methods of manufacture.

2. Background Art

Infrared ("IR") detectors and optics (e.g., IR seeker systems in modern weaponry such as "smart bombs") tend to be complex and expensive. Infrared system raw materials are expensive and processing costs are sometimes prohibitive, especially for weapons that will be destroyed after a single mission. Processes that can reduce the complexity and/or cost of a infrared systems are therefore significant.

Expensive sensors and expensive optics have long plagued infrared imaging systems. IR capability has been shown to be beneficial in military, firefighting, surveillance, night driving, and predictive maintenance applications. However, proliferation of these sensors require that costs be significantly reduced. In line with this goal, uncooled detector arrays have been developed in recent years that are significantly more reliable and lower in cost than their cooled counterparts. For systems based on these sensors, the optics are projected to soon be the most expensive component, if alternatives to conventional materials and fabrication techniques cannot be found. Conventional materials include Germanium, Silicon, Zinc Selenide, Zinc Sulfide, and others. Conventional fabrication techniques include grinding, polishing and diamond-point turning.

Reflective and refractive optics have been used for seeker optics. Diamond turned mirrors are relatively inexpensive, however the field of view of a reflective system is small. By increasing the number of mirrors or corrector elements, the field of view may be increased. However this leads to higher cost and/or packaging problems.

The present invention provides lens elements made of low cost infrared material that can be diamond turned or ultimately molded as a single component, resulting in a significant cost savings.

SUMMARY OF THE INVENTION (DISCLOSURE OF THE INVENTION)

The present invention is of an optic (and corresponding method of manufacture) comprising a center portion comprising a front surface and a back surface; and a mangin surrounding the center portion and comprising a front surface and a back surface, and wherein the front surface of the center portion is flat and reflective rearward; and wherein the front surface of the mangin is spherical. In the preferred embodiment, the back surface of the center portion is aspheric, the back surface of the mangin comprises a kinoform, and the center portion and the mangin are unitary. The optic preferably additionally comprises a flat reflective surface rearward and spaced from the mangin for reflecting light passing through the mangin toward the center portion, as well as a detector rearward of the flat reflective surface receiving light reflected from the center portion. The center portion and the mangin preferably comprise a moldable material, more preferably a glass comprising a chalcogenide element, and most preferably an AMTIR material. The invention is also of an infrared optical system comprising such optic.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DESCRIPTION OF THE PREFERRED EMBODIMENTS (BEST MODES FOR CARRYING OUT THE INVENTION)

The present invention is of an optic and optical design techniques therefor that reduce the cost and complexity of infrared ("IR") optics. The example presented, which is not intended to limit the invention, comprises two lens elements that are preferably, but not necessarily, fabricated as a single entity. A diffractive and an aspheric surface are preferred to optimize performance while minimizing the number of lens elements and reducing the complexity of the system. A mirror is used to fold the optical path back through the center of the light gathering lens. Employment of the inventive design techniques and inexpensive optical materials significantly reduces the cost of the resulting systems. Furthermore, the IR material is preferably moldable, thereby further reducing fabrication costs in production quantities.

Figure 1:
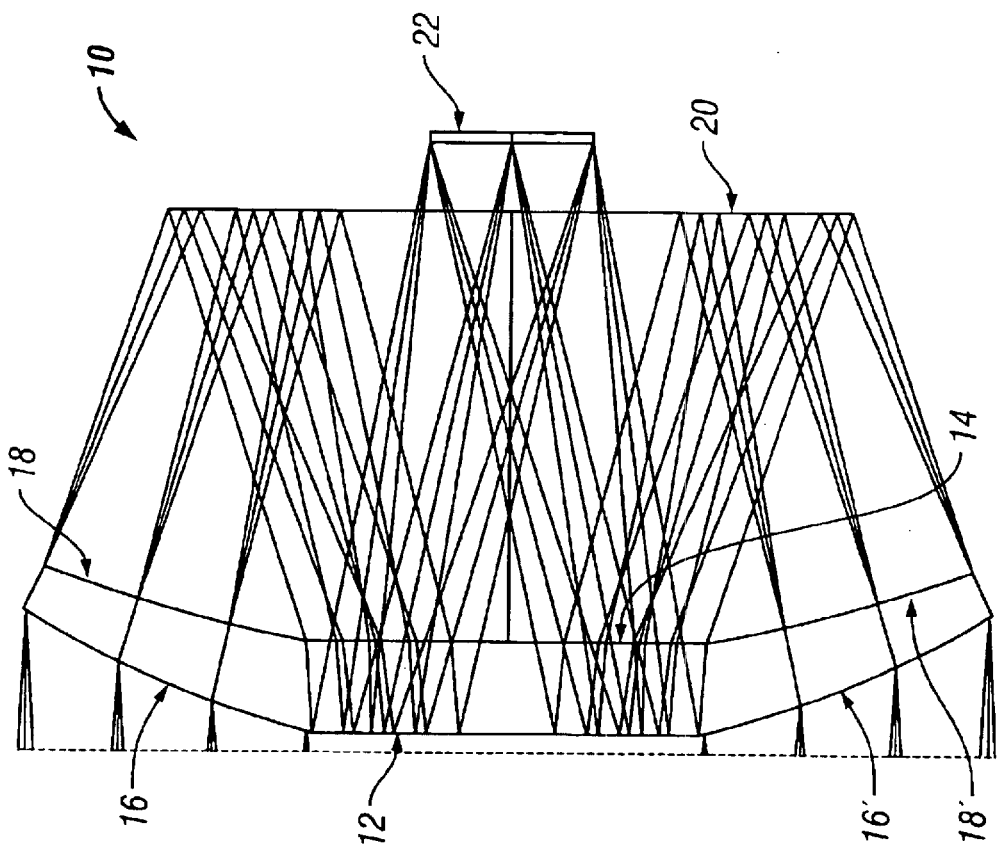
FIG. 1 is a diagram of the preferred optic of the invention.
Figure 2:
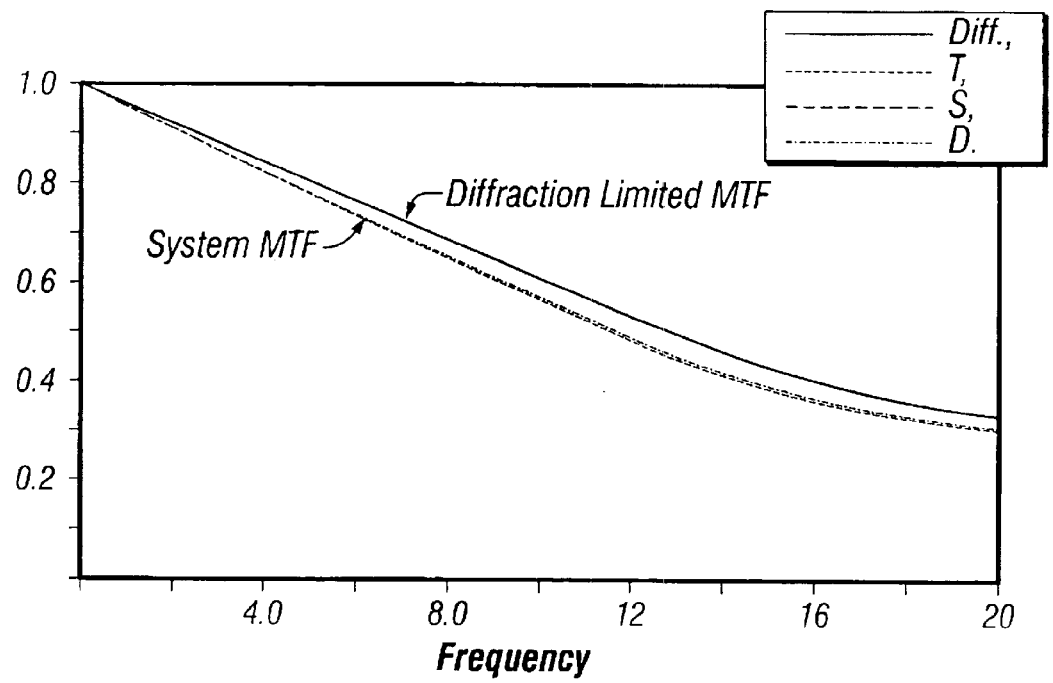
FIGS. 2–4 are graphs of Modulation Transfer Function ("MTF") calculations on axis for the optic of FIG. 1, at 0.7 of the horizontal field, and at full horizontal field, respectively.
Figure 3:
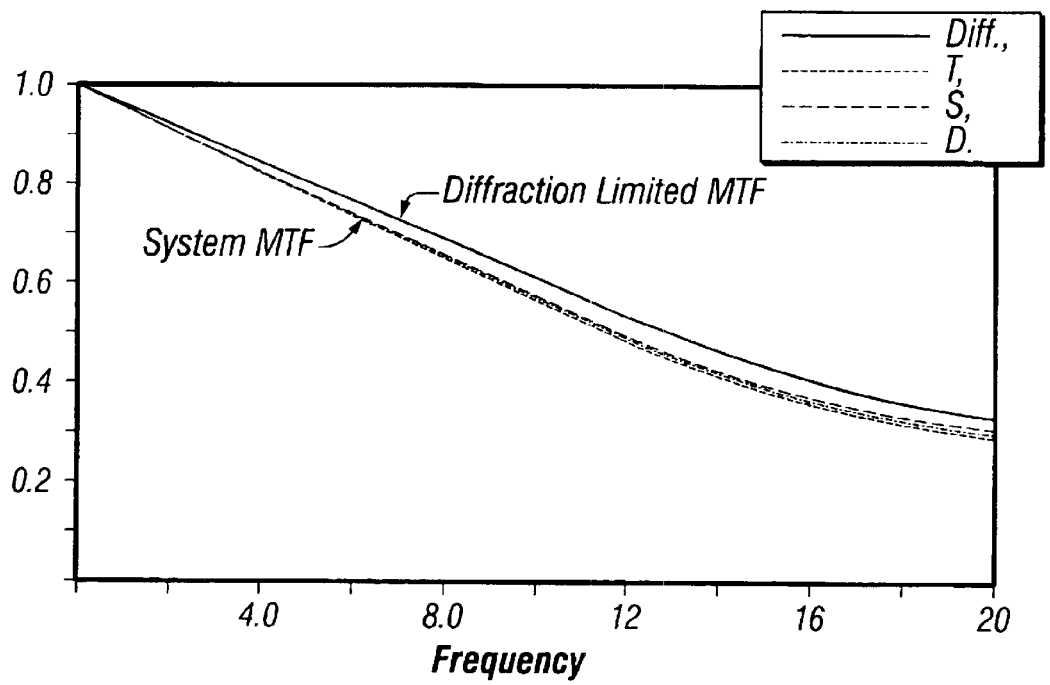
Figure 4:
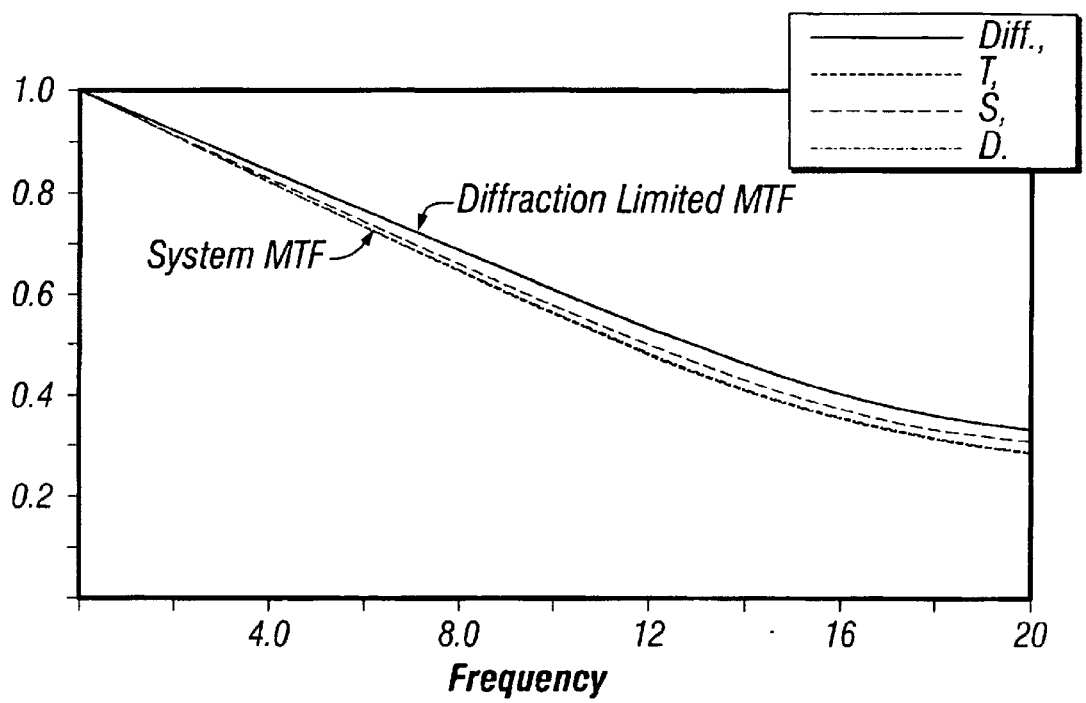
Figure 5:
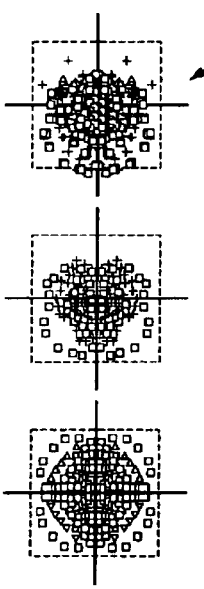
FIG. 5 presents spot diagrams for the same field points with a rectangle of 50 microns plotted around each spot.
Figure 5:
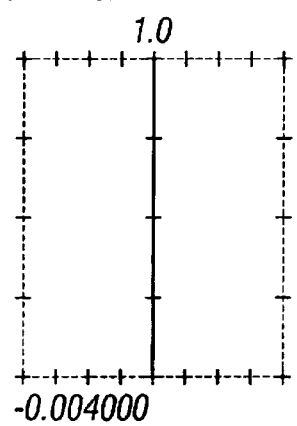

FIG. 1 is a diagram of the illustrative lens system manufactured according to the present invention. The system is preferably an f/1.9 system designed to operate in the 8 to 12 micron spectral region with an uncooled detector (50×50 micon pixels) and to provide a 3.12×4.16 degree field of view. FIGS. 2–4 are Modulation Transfer Function ("MTF") calculations for on axis, 0.7 of the horizontal field, and full horizontal field, respectively, which show that the system is close to diffraction limited. FIG. 5 presents spot diagrams for the same field points with a rectangle of 50 microns plotted around each spot.

Referring to FIG. 1, the optic/lens system 10 of the invention preferably comprises flat reflective surface 12, aspheric surface 14, spherical surfaces 16,16', kinoform surfaces 18,18', flat reflective surface 20, and detector 22 (cooled or uncooled). Advantages of the system are its compactness, good performance, wide field of view (approximately 5.2 degrees), unitary lens component 24, and passive athermalization.

The present invention, referred to as the "Folded Molded Mangin" optical system provides a complex optical design that can be fabricated in a single element. The material preferred for the unitary lens component is a glass comprising a chalcogenide element (preferably an Amorphous Material Transmitting Infrared Radiation ("AMTIR") product manufactured by Amorphous Materials, Inc., most preferably AMTIR-4) that can be molded at relatively low temperatures. Finally, the folded optical design creates a compact system suitable for IR seekers in particular, where cost is of prime importance due to the disposable nature of most seeker applications. While the application presented herein is an infrared system, the design philosophy of the invention can be used for any optical system where refractive and reflective materials are available.

Throughout the specification and claims, "Mangin" and "Mangin mirror" are defined as a spherical concave mirror combined with a diverging lens. A "kinoform" is defined as a diffractive optic comprising a non-uniform surface profile to manipulate diffraction of a wavefront.

The invention is illustrated by application to a long-wave (8 to 12 microns) seeker. Seekers have three major subsystems: (1) optics; (2) sensor (detector and electronics); and (3) eyeball gimbal assembly 28 (see FIG. 6). To effect a significant cost reduction in the optical system housed by the gimbal, it preferably comprises a low-cost infrared material. To keep the number of lens elements to a minimum, aspheric and kinoform surfaces are preferred. The characteristics of the exemplary optical system are summarized approximately below:

| | |
|---|---|
| Effective Focal Length | 8.6" minimum |
| F/Number | 2.0 or faster |
| Spectral Range | 8 to 12 microns |
| Field of View | 2.6 degrees diagonal |
| Obscuration | 25% maximum |
| Detector Array Size | 640 × 480 |
| Pixel Size | 50 × 50 microns |
| Detector Dimensions | 16 × 12 × 20 mm |

The system of the present invention is preferably accomplished with a single lens, with no bonding required, that forms both elements of the optical path. Only a simple fold mirror is otherwise required. With the preferred moldable material, the core of the optical system can be fabricated from a single piece of molded IR glass.

A discussion of possible systems and alternative embodiments are next discussed. One possible systems is a straight-through lens systems comprising a kinoform on the back of a large lens and an aspheric on the back of a small lens. This system has no obscuration and has good performance over the entire field of view. However, the system is too long to permit more than a few degrees of gimbal motion.

The system can be improved by folding such system with a flat mirror to redirect the light path through the center of the collecting optic. The obscuration created is acceptable (approximately 20% of the collecting area). It is possible to mount the small lens in the center of the large lens, making assembly relatively simple. More economically, the large and small lens elements can be diamond turned or molded as a single component which results in a significant cost savings in production quantities. This system is nevertheless longer than desired, but more importantly, the detector array is located in front of the first lens. For an IR seeker, one of the most sensitive elements is now located external to the overall housing. While it is possible to use the large lens in this way and mount the camera in the center (it may even be desirable for some applications), it is not generally an advantageous configuration. In the simplest version of this configuration, the entire camera with its electronics would be mounted on the large lens, which increases the length of the system and increases the obscuration. If the electronics are separated from the detector, additional electronics issues arise and the sensor assembly becomes unique for each application.

The fold mirror could be curved which adds another variable that can be used to shorten the overall system and/or improve the image quality. However, the objections stated earlier are unresolved and the cost and complexity of the optics are increased.

An on axis double fold can be employed, which yields a compact system with the detector array located within the confines of the housing. However, the large central obscuration (approximately 40% of the collecting area) reduces the sensitivity of the system, and begins to have a strong effect on the spatial frequency characteristics of the optical system (modulation transfer function). One also loses the cost savings from having a single fabrication element.

An offset version of the two mirror folding arrangement moves the detector to the rear and offsets the obscuration in the aperture. At 25% of the collecting aperture, the obscuration is improved over the on axis design, and the performance is good. The system is nevertheless longer than desired and the feature of combining the two lenses into a single element is lost. It will be more difficult to align and four elements would result in higher than desired production cost.

The optic of FIG. 1 meets optical requirements, packaging, and cost preferences. It comprises two refractive elements and two folds. The double fold places the detector within the overall housing. The two refractive elements and one of the folds can be fabricated as a single element. The first fold is a flat front surface mirror while the second is a Mangin, where the reflection takes place on the surface of the second element. Color correction is achieved by employing a diffractive surface on the back of the large element. The small Mangin element centered within the large element obscures about 20% of the collecting area. The reflecting surface of the Mangin is flat while the front surface is aspheric. The small Mangin element can be fabricated as an integral part of the large lens, eliminating the need for any mechanical structure to hold the lens, thus minimizing the obscuration. Assembly and alignment of the system is also simplified because it is built into the fabrication process of the combined elements.

Figure 6:
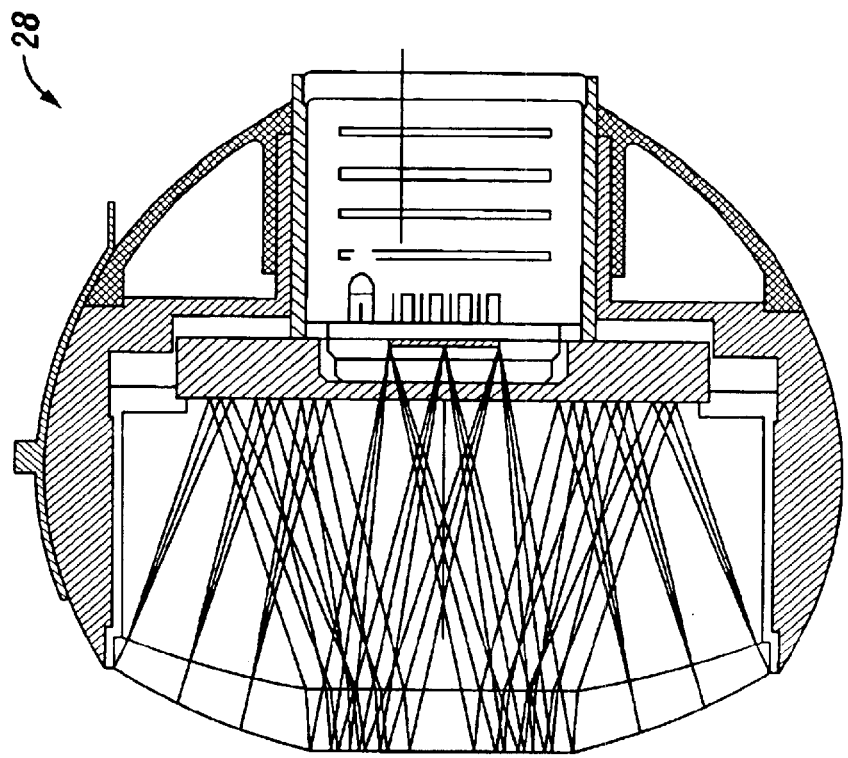
FIG. 6 is a diagram of an eyeball gimbal comprising the optic of FIG. 1.

The folded molded Mangin optical system was fabricated as shown in FIG. 6. The single combined lens element was diamond-point turned ("DPT") using a OPT standard machine. The first reflector was fabricated from aluminum. The optical components were assembled into the eyeball gimbal, which was an eyeball-shaped gimbal made possible by the short physical size of the folded molded Mangin.

As uncooled detector arrays begin to significantly lower their cost, the cost of long wave imaging systems will be driven by the cost of the optics. The present invention provides an optical system that has a large collecting area, long focal length, and yet a short physical length. This system can be fabricated from a single refractive element and a simple flat mirror. Alignment is trivial, and the complex element is made from a material that is low cost and can be molded. The performance of this system is congruent to systems of similar aperture and obscuration.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. An optic comprising:
    a center portion comprising a front surface and a back surface; and
    a mangin surrounding and attached to an edge of said center portion and comprising a front surface and a back surface; and
    wherein said front surface of said center portion is flat and reflective rearward; and
    wherein said front surface of said mangin is convex forward and spherical.

2. The optic of claim 1 wherein said back surface of said center portion is aspheric.

3. The optic of claim 1 wherein said back surface of said mangin comprises a kinoform.

4. The optic of claim 1 wherein said center portion and said mangin are unitary.

5. The optic of claim 1 additionally comprising a flat reflective surface rearward and spaced from said mangin for reflecting light passing through said mangin toward said center portion.

6. The optic of claim 5 additionally comprising a detector rearward of said flat reflective surface receiving light reflected from said center portion.

7. The optic of claim 1 wherein said center portion and said mangin comprise a moldable material.

8. The optic of claim 7 wherein said center portion and said mangin comprise a glass comprising a chalcogenide element.

9. The optic of claim 8 wherein said center portion and said mangin comprise an AMTIR material.

10. An infrared optical system comprising an optic according to claim 1.

11. A method of making an optic, the method comprising the steps of:
    forming a center portion comprising a front surface and a back surface; and
    forming a mangin surrounding and attached to an edge of the center portion and comprising a front surface and a back surface; and
    wherein the front surface of the center portion is flat and reflective rearward; and
    wherein the front surface of the mangin is convex forward and spherical.

12. The method of claim 11 wherein the back surface of the center portion is aspheric.

13. The method of claim 11 wherein the back surface of the mangin comprises a kinoform.

14. The method of claim 11 wherein the center portion and the mangin are unitary.

15. The method of claim 11 additionally comprising placing a flat reflective surface rearward and spaced from the mangin for reflecting light passing through the mangin toward the center portion.

16. The method of claim 15 additionally comprising placing a detector rearward of the flat reflective surface receiving light reflected from the center portion.

17. The method of claim 11 wherein the center portion and the mangin comprise a moldable material.

18. The method of claim 17 wherein the center portion and the mangin comprise a glass comprising a chalcogenide element.

19. The method of claim 18 wherein the center portion and the mangin comprise an AMTIR material.

20. A method of making an infrared optical system comprising making an optic according to claim 11 and incorporating the optic into the infrared optical system.

* * * * *

UNITED STATES PATENT AND TRADEMARK OFFICE
CERTIFICATE OF CORRECTION

PATENT NO. : 6,867,930 B1
DATED : March 15, 2005
INVENTOR(S) : Richard A. LeBlanc and Max Amon It is certified that error appears in the above-identified patent and that said Letters Patent is hereby corrected as shown below:

Title page,
Item [57], ABSTRACT,
Line 6, the word "mangin" should read -- Mangin --.

Drawings,
Sheet 3, Figure 5, the word "Magin" should read -- Mangin --.

Column 1,
Lines 48, 52, 54, 55, 56, 57 and 60, the word "mangin" should read -- Mangin --.

Column 5,
Lines 22 and 24, the word "mangin" should read -- Mangin --.
Lines 26 and 27, the word "mangin" should read -- Mangin --.
Lines 33, 35 and 38, the word "mangin" should read -- Mangin--.

Column 6,
Lines 7 and 12, the word "mangin" should read -- Mangin --.
Lines 17, 19, 22, 28, 30 and 33, the word "mangin" should read -- Mangin --.

Signed and Sealed this

Seventh Day of June, 2005

JON W. DUDAS
*Director of the United States Patent and Trademark Office*